United States Patent [19]

Kitamoto

[11] Patent Number: 5,428,747
[45] Date of Patent: Jun. 27, 1995

[54] PRINT MANAGEMENT SYSTEM UTILIZING SEPARATE STORAGE UNITS FOR STORING IMAGE, EDIT, AND CONTROL INFORMATION RELATING TO PREPRESS JOBS THEREOF

[75] Inventor: Toru Kitamoto, Kyoto, Japan

[73] Assignee: Dainippon Screen Mfg. Co., Ltd., Kyoto, Japan

[21] Appl. No.: 914,329

[22] Filed: Jul. 17, 1992

[30] Foreign Application Priority Data

Jul. 26, 1991 [JP] Japan .................................. 3-210148

[51] Int. Cl.⁶ .............................................. G06F 3/12
[52] U.S. Cl. ........................... 395/275; 395/100; 364/225.6; 364/225.8; 364/226; 364/DIG. 1
[58] Field of Search ............... 395/200, 275, 101, 102, 395/114, 115, 116, 144, 162, 163, 164, 165, 100; 358/500, 448; 382/47

[56] References Cited

U.S. PATENT DOCUMENTS

| | | | |
|---|---|---|---|
| 4,682,286 | 7/1987 | Yamada | 364/200 |
| 4,992,781 | 12/1991 | Iwasaki | 340/747 |
| 5,170,466 | 12/1992 | Rogan et al. | 395/145 |
| 5,339,172 | 8/1994 | Robinson | 358/462 |
| 5,357,607 | 10/1994 | Sathi et al. | 395/166 |

FOREIGN PATENT DOCUMENTS 60-143718  7/1985  Japan .

*Primary Examiner*—Thomas C. Lee
*Assistant Examiner*—Sang Hur Kim
*Attorney, Agent, or Firm*—Lowe, Price, LeBlanc & Becker

[57] ABSTRACT

The invention provides a printing data management system which realizes unitary control and management of printing data including parts data like pictures and photographs used in reproduction and assembled data so as to improve the efficiency of prepress process. The system is provided with an edit device for editing various process control data, which includes: discrimination data for identifying a target print from other prints; and instruction data, file management data, and individual progress data generated corresponding to each of plural jobs. An operator can readily control the progress of each job throughout the prepress process based on this process control data. The system of the invention also allows efficient information storage and retrieval.

16 Claims, 8 Drawing Sheets

| ITEMS | DATA |
|---|---|
| NAME OF CLIENT | A PRINTING COMPANY |
| TYPE OF PRINT | CATALOG |
| ORDER NUMBER | 0 0 0 1 |
| DATE OF ORDER | MAY 10, 1991 |
| DEADLINE | DECEMBER 31, 1991 |

Dds

| ITEMS | JOB NO. 1 | JOB NO. 1 |
|---|---|---|
| INSTRUCTION | CUT-IN OF PHOTOGRAPH A001 | CUT-IN OF PHOTOGRAPH A002 |
| LAYOUT | POSITION A1 | POSITION A2 |

Fig. 7

| ITEMS | JOB NO. 1 | JOB NO. 1 | JOB NO. 1 |
|---|---|---|---|
| WORK FILE NAME | A001 | A002 | A000 |
| ATTRIBUTE OF DATA | PARTS | PARTS | FINAL |
| STORAGE FILE NAME | MT. FUJI | CAR | PAGE 1 |
| PERMANENT STORAGE | REQUIRED | REQUIRED | REQUIRED |

Fig. 8

PROGRESS OF PROCESSING

1. INDIVIDUAL PROGRESS DATA

| JOB NO. | DATA |
|---------|------|
| 1 | CONCLUDED |
| 2 | CONCLUDED |
| 3 | NOT CONCLUDED |
| 4 | NOT CONCLUDED |
| 5 | NOT CONCLUDED |

2. TOTAL PROGRESS DATA

NOT CONCLUDED

WHOLE PROCESS CONCLUDED

36a

PRINT MANAGEMENT SYSTEM UTILIZING SEPARATE STORAGE UNITS FOR STORING IMAGE, EDIT, AND CONTROL INFORMATION RELATING TO PREPRESS JOBS THEREOF

BACKGROUND OF THE INVENTION

1. Field of the Invention

The present invention relates to a method of and an apparatus for managing printing data including parts data representing pictures and photographs image reproduction data representing a one-page image used in prepress process.

2. Description of the Prior Art

A computer-aided prepress system consists of various devices, which generally include a reading scanner, an text editing device, a block-copy production apparatus, and a page make-up apparatus. Desirable printed matter is created with such devices according to the following process. Various parts data including picture data and character data are generated with the reading scanner and the text editing device. The parts data are then integrated to image reproduction data representing a one-page image with block-copy production apparatus and page make-up apparatus. Printing plates are produced from the image reproduction data, and the desired printed matter is printed with the printing plates by a printing machine. In such a prepress system, some devices have a storage unit which stores printing data in an off-line medium such as a magnetic tape or an optical disk. Printing data, or parts data, generated with a reading scanner is immediately stored in a magnetic tape of the storage unit, and the magnetic tape is successively transferred to other devices for editing, lay-out, or further processing. Namely, transfer of printing data is attained through the off-line media like magnetic tapes.

Picture image data, especially of a full-color image, has a large data volume and thereby requires a large capacity of a storage unit. For example, image data representing one full-color picture image of size A4 requires the capacity of 60 MB (Mega Bites). Any device in the printing system which treats the printing data including a picture image requires a storage unit of a large capacity, even if the device does not change the printing data itself. This results in the increased price of each device in the system and sometimes prevents desirable extension of the system.

Incidentally, in the current prepress system, an operator checks the progress of the prepress process without reading the printing data stored in a magnetic tape with a prepress device. Such direct access method is troublesome and time-consuming.

Some printing data needs to be stored for a certain time period so that they can be used in reprinting, reimpression, or partial use for other prints. Such printing data stored in magnetic tapes are classified according to a register book including names of clients and dates of prints, and held in a cabinet. Printing data required for reprinting or reimpression is retrieved manually according to the contents of the register book. This data management system is also troublesome and consumes much time for information storage and retrieval.

SUMMARY OF THE INVENTION

An object of the invention is thus to reduce the capacity of data storage units in a prepress system.

Another object of the invention is to provide a method of and an apparatus for readily controlling the progress of prepress processes.

A further object of the invention is to improve information storage and retrieval in a prepress system.

The present invention is directed to a printing data management system for producing desired printing data representing an image to be printed, comprising:

plural prepress devices, each executing at least one of prepress jobs;
a long-term storage unit for storing printing data including parts image data and assembled image data
a communication network for data transfer; and
a data management device, connected to the plural devices and the long-term storage unit via the communication network, comprising:
(1) process control data editing means for editing process control data including:
  (A) identification data for identifying the desired printing data to be produced; and
  (B) data being generated for each of the plural prepress jobs including:
  (B-1) instruction data indicating a certain process performed by each prepress device;
  (B-2) file management data comprising a first file name of printing data to be used in each prepress job, permanent storage data specifying printing data to be permanently stored after each job, and a second file name of the printing data to be permanently stored; and
  (B-3) individual progress data representing the progress of each prepress job;
(2) process control data storage means for storing the process control data edited by the process control data editing means;
(3) a working memory unit for temporarily storing printing data required for producing the desired printing data with the plural prepress devices;
(4) control means for, in response to the identification data which is given from one of the plural prepress devices, supplying the process control data stored in the process control data storage means and the printing data stored in the working memory unit to the corresponding prepress device, storing an end mark which is set in the individual progress data by each prepress device on completion of each job, and outputting the individual progress data on demand; and
(5) storage data management means for transferring the printing data specified to be permanently stored by the permanent storage data and stored in the working memory unit, to the long-term storage unit and storing the printing data therein with the second file name.

According to an aspect of the present invention, the process control data editing means further comprises an output unit for displaying a list of the instruction data and file management data on display means.

According to another aspect of the present invention, the control means comprises output means for displaying a list of the individual progress data on display means.

According to still another aspect of the present invention, the control means comprises store protection means for keeping the file management data unchanged through processing with each of the plural prepress devices.

According to a preferred embodiment, the file management data includes attribute data defining whether printing data is parts data or final printing data.

According to another preferred embodiment, the first file name is identical with the second file name.

According to another preferred embodiment, the storage data management means successively transfers the printing data to be permanently stored from the working memory unit to the long-term storage unit when end marks for all the prepress jobs are set in the individual progress data.

According to a preferred embodiment, the storage data management means comprises elimination means for eliminating the printing data to be permanently stored from the working memory unit after transfer of the printing data from the working memory unit to the long-term storage unit is completed.

The present invention is directed to a printing data management method for producing desired printing data representing an image to be printed with a prepress system, comprising: plural prepress devices, each executing at least one of prepress jobs; a long-term storage unit for storing printing data including parts image data and assembled image data; a communication network for data transfer; and a data management device, the method comprising the steps of:

(1) preparing process control data including:
   (A) identification data for identifying the desired printing data to be produced; and
   (B) data, being generated for each of the plural prepress jobs, including:
      (B-1) instruction data indicating a certain process performed by each prepress device;
      (B-2) file management data comprising a first file name of printing data to be used in each prepress job, permanent storage data specifying printing data to be permanently stored after each job, and a second file name of the printing data to be permanently stored; and
      (B-3) individual progress data representing the progress of each prepress job;

(2) storing the process control data in the data management device;

(3) temporarily storing, the data management device, printing data required for producing the desired printing data with the plural prepress devices;

(4) in response to the identification data which is given from one of the plural prepress devices to the data management device, supplying the process control data stored in the data management device and the printing data stored in the data management device to the corresponding prepress device, storing an end mark which is set in the individual progress data by each prepress device on completion of each job, and outputting the individual progress data from the data management device on demand; and (5) transferring the printing data specified to be permanently stored by the permanent storage data and stored in the data management device, to the long-term storage unit and storing the printing data therein with the second file name.

According to the printing data management system of the invention, desired printing data is produced according to the following steps.

First, process control data is edited with the data management device. Here the process control data includes: identification data for identifying the desired printing data to be produced; and instruction data, file management data, and individual progress data, generated for each of plural prepress job. In the following step, printing data to be processed is stored in the working memory unit. Each prepress device extracts required printing data from the working memory unit and processes the printing data according to the process control data of each prepress job. When each prepress job is concluded, an end mark is set in the individual progress data. Completion of all the prepress job finishes the process of the desired printing data.

The instruction data is made with respect to each prepress job. Each prepress device can thereby selectively load printing data required for a certain prepress job. Namely, the prepress device does not require a large capacity of a storage unit.

The individual progress data is information of representing the progress of each prepress job. When a certain prepress job is concluded in each prepress device, an end mark is set in the individual progress data. An operator can check the progress of each prepress job according to the individual progress data.

The file management data includes permanent storage data specifying whether printing data in the working memory unit is to be permanently stored. The storage data management means reads the permanent storage data on completion of the whole editing process, and transfers the printing data to the long-term storage unit. An operator does not need to individually specify the printing data to be stored in each prepress job but can centrally manage the printing data specified by the file management data.

The above and further objects and features of the invention will more fully be apparent from the following detailed description with accompanying drawings.

BRIEF DESCRIPTION OF THE DRAWINGS

FIG. 7 is an explanatory view showing an example of file management data;

FIG. 8 is an explanatory view showing another function of the process control data editing device;

DESCRIPTION OF THE PREFERRED EMBODIMENT

Figure 1:
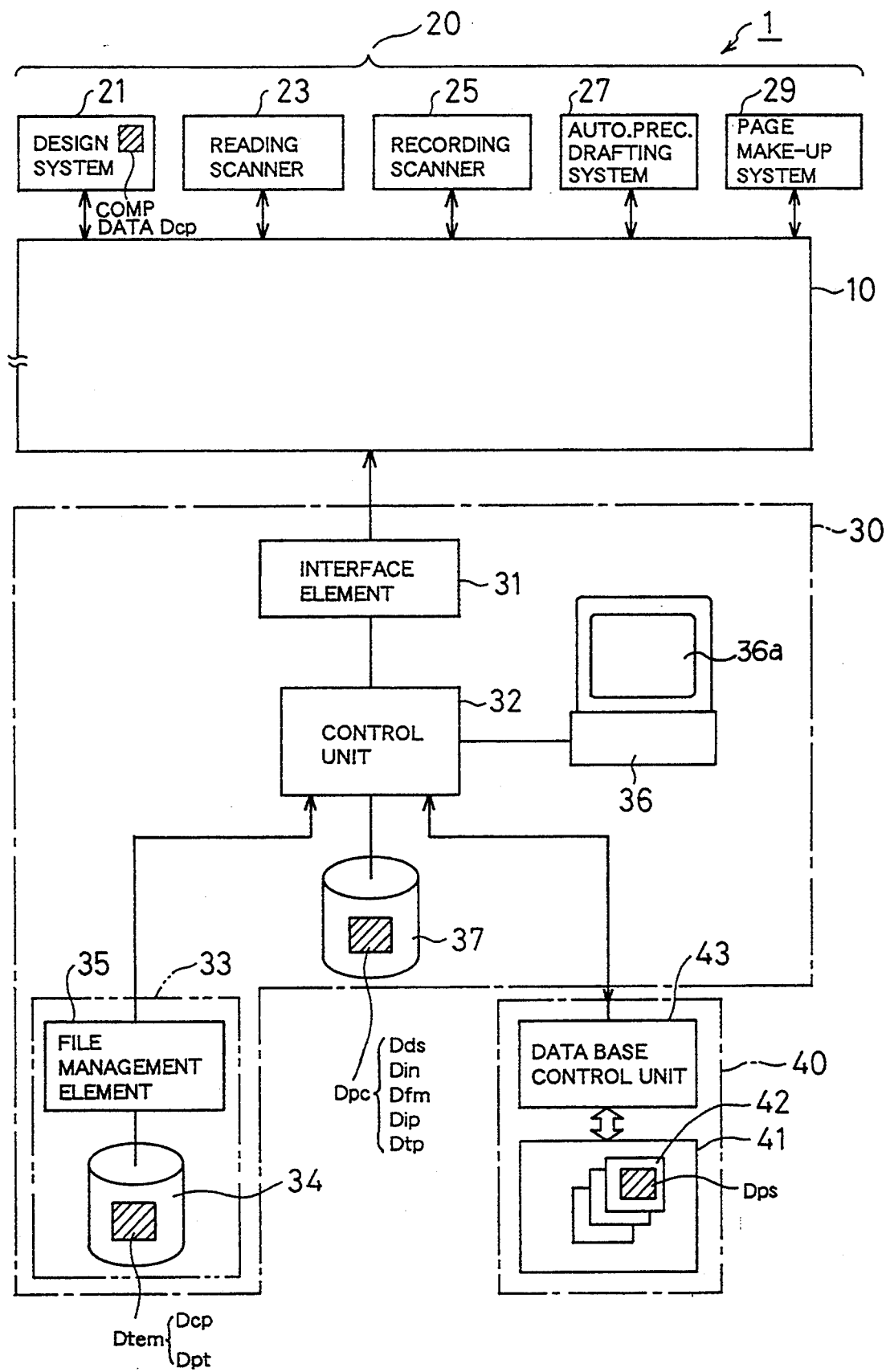
FIG. 1 is a block diagram showing a printing data management apparatus embodying the invention.

FIG. 1 is a block diagram illustrating a printing data management apparatus 1 embodying the invention. The printing data management apparatus 1 includes: plural prepress devices 20 connecting to one another via a communication network 10; a data management device 30 for storing various printing data and controlling and managing the whole prepress process; and a long-term storage unit 40 for storing and managing printing data according to instructions from the data management device 30.

Typical examples of the prepress devices 20 are: a design system 21; an reading scanner 23; an recording scanner 25; an automatic precision drafting system 27; and a page make-up system 29.

The design system 21 generates comprehension layout data (hereinafter referred to as Comp data) Dcp indicating layout of a one-page image according to the planning and design of prints.

The data management device 30 includes: an interface element 31 communicating with the prepress devices 20 via the communication network 10; a control unit 32 being connected with the interface element 31 for processing various data; a working memory unit 33 for temporarily storing printing data Dtem under processing; a process control data editing device 36 with a display unit 36a for editing process control data Dpc with a keyboard or mouse; and a process control data storage unit 37 for temporarily storing the process control data Dpc edited with the process control data editing device 36.

The working memory unit 33 includes: a magnetic disk element 34 for storing the printing data Dtem; and a file management element 35 for managing the printing data Dtem stored in the magnetic disk element 34.

The long-term storage unit 40 includes: an optical disk memory unit 41 with an automatic changing mechanism for automatically exchanging plural optical disks 42; and a data base control unit 43 for managing permanent storage printing data Dps stored in the optical disks 42 of the optical disk memory unit 41.

The following is the prepress process with the printing data management apparatus 1 of the embodiment.

First, the Comp data Dcp was generated by a designer with the design system 21. The Comp data Dcp represents a rough draft of design consisting of lineworks and characters, which is generally used for presentation. The Comp data Dcp under a given file name is transferred from the design system 21 to the data management device 30 via the communication network 10. The control unit 32 of the data management device 30 stores the Comp data Dcp in the magnetic disk element 34 of the working memory unit 33. The given file name of the Comp data Dcp is registered in the file management element 35 of the working memory unit 33.

An operator then inputs the process control data Dpc into the process control data editing device 36. More concretely, the operator specifies the given name of the Comp data Dcp, transfers the Comp data Dcp to the process control data editing device 36, and edits the process control data Dpc required for production of the desired printed matter based on the Comp data Dcp. The process control data Dpc includes discrimination data Dds, instruction data Din, file management data Dfm, and progress data Dip, Dtp.

The discrimination data Dds identifies a target print to be produced from other prints, and includes information representing the name of a client, the type of a print, the order number, the date of order, and the deadline.

The instruction data Din, made for each job for the target print, includes with a job number (for example, Job No. 1, Job No. 2, etc.), and information representing instructions for the job and layout.

The file management data Dfm is used to manage printing data required for each job. The data Dfm includes information representing a work file name of parts data used in the job and of the resultant printing data, the attribute of data (parts or resultant data), the storage file name, and a permanent storage mark showing whether permanent storage is required or not.

The progress data includes individual progress data Dip representing the progress of each job and total progress data Dtp representing the progress of the whole prepress process.

Detailed steps of creating such process control data Dpc for a catalog are explained by way of example.

Figures 2, 3:
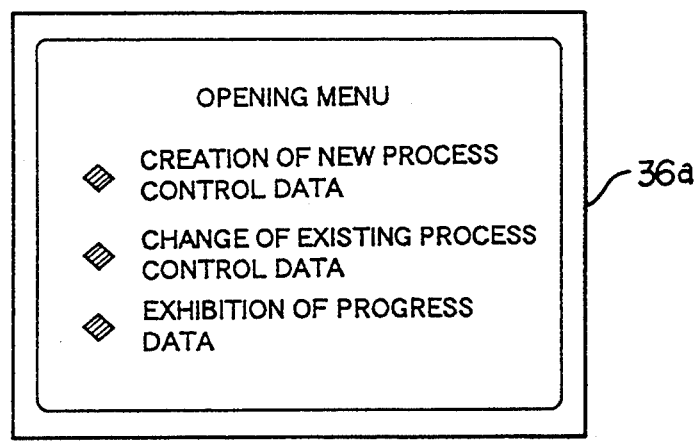
FIG. 2 is an explanatory view showing an opening menu displayed on the display unit of the process control data editing device.
FIG. 3 is an explanatory view showing an example of discrimination data displayed on the display unit of the process control data editing device.
Figure 4:
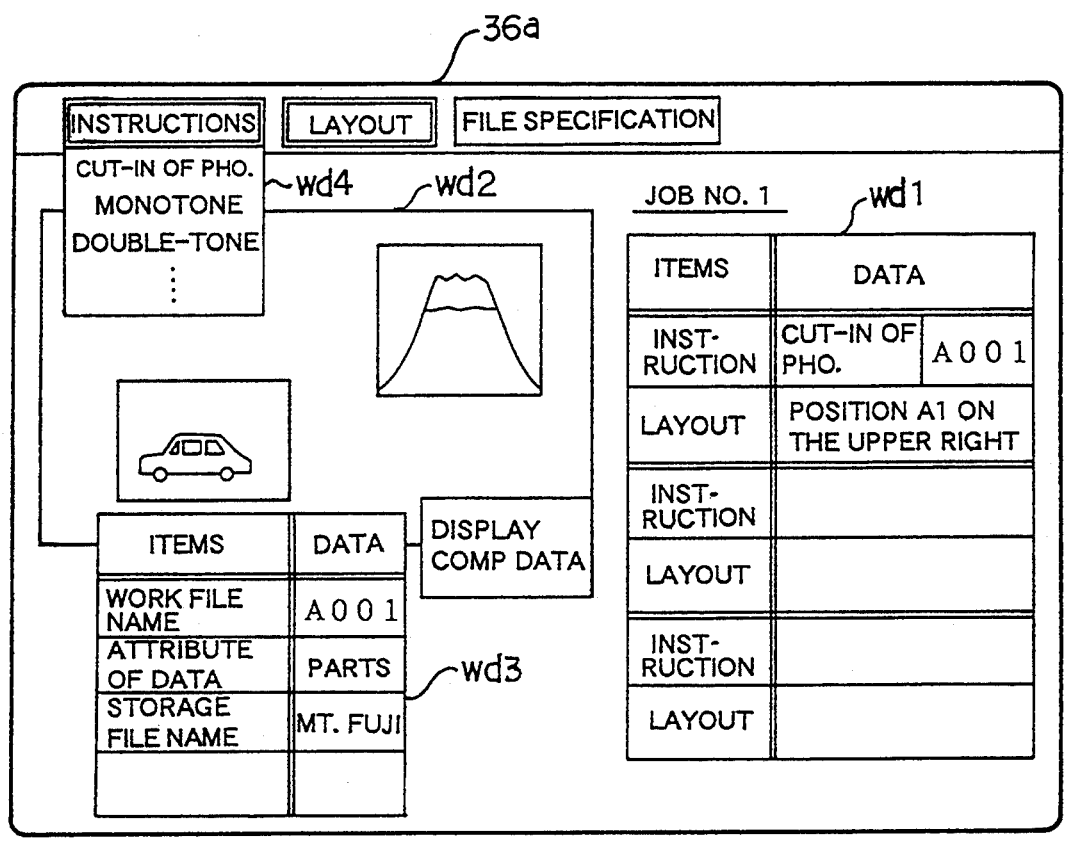
FIG. 4 is an explanatory view illustrating a function I of the process control data editing device.

FIG. 2 shows an opening menu displayed on the display unit 36a of the process control data editing device 36, FIG. 3 is an explanatory view showing an example of the discrimination data Dds, and FIG. 4 illustrates an example of the process control data Dpc displayed on the display unit 36a.

The opening menu displayed on the display unit 36a includes the choices of 'creation of new process control data', 'change of existing process control data', and 'exhibition of progress data' as seen in FIG. 2.

When an operator selects the 'creation of new process control data' with a keyboard or a mouse, the screen of the display unit 36a is changed to show an input list for 'creation of new discrimination data'. The operator then inputs discrimination data Dds including the name of a client and the type of a print as shown in FIG. 3.

After completing input of the new discrimination data Dds, the operator creates new process control data Dpc for each job, which is individually executed by each prepress device 20. Here the screen of the display unit 36a displays an input list for creating new instruction data Din and file management data Dfm as seen in FIG. 4. The display on the screen includes a job number given by an automatic numbering mechanism, a window Wd2 showing the Comp data Dcp, an instruction window Wd1 showing a list of information of given instructions and layout. The operator first places a cursor (not shown) in an "INSTRUCTION" box of the window Wd1 and selects a choice out of a preset selection menu Wd4 pulled down under the menu "INSTRUCTION" with a mouse. When the operator clicks the command 'file specification' on the menu bar, a file window Wd3 is displayed for input of the work file name or other data. The whole prepress process is divided into a number of jobs, and instruction data Din and file management data Dfm are created for each job.

Figures 5, 6:
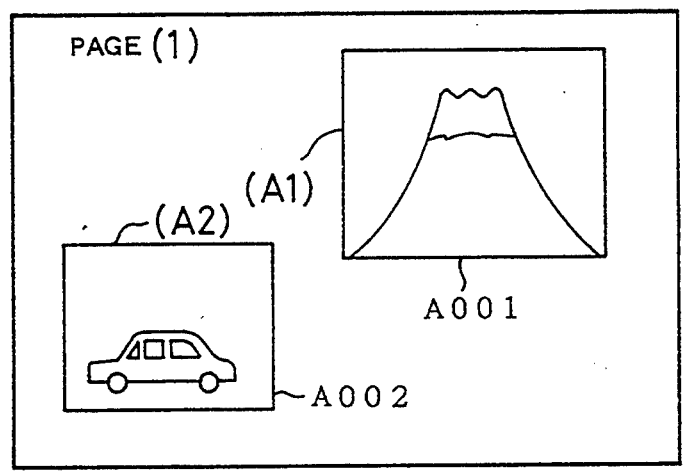
FIG. 5 is an explanatory view illustrating a final print based on which process control data are generated.
FIG. 6 is an explanatory view showing an example of instruction data.

Process control data Dpc representing the page 1 of the catalog shown in FIG. 5 is created in the following steps.

When the operator starts editing of the process control data Dpc, the display unit 36a shows a screen page for input of data representing Job No. 1 as seen in FIG. 4. First, the instruction window Wd1 used for input of instruction data Din is displayed on the screen. The operator specifies a certain file name and makes the layout, which is represented by the Comp data Dcp, displayed on the screen. The operator refers to the window Wd2 of the Comp data Dcp, specifies instruction data Din representing instructions and layout as shown in FIG. 6, and inputs the instruction data Din into the instruction window Wd1. In FIG. 6, A001 and A002 represent the names of work files containing photograph data to be processed, and A1 and A2 denote cut-in positions of the photographs.

When the operator clicks the 'file specification' command during creation of instruction data Din, the file window Wd3 is displayed on the screen. The operator then specifies the file management data Dfm representing the work file names, the attribute of data, and the permanent storage mark as shown in FIG. 7, and inputs the file management data Dfm into the file window Wd3. Here the work file name represents the name of parts data Dpt such as pictures and photographs. The attribute of data shows whether the printing data Dpt is parts data or final data. The name of the storage file shows the file name of printing data stored in the optical disk memory unit 41. The storage file name is registered in the data base control unit 43. The permanent storage mark represents information showing whether the parts data Dpt is to be permanently stored under the storage file name in the long-term storage unit 40.

When the process control data Dpc is created for all the jobs, a program stored in the process control data editing device 36 proceeds to produce the individual progress data Dip and the total progress data Dtp. The individual progress data Dip and the total progress data Dtp are changed between the initial state, 'not concluded' and the final state, 'concluded'. The operator can input an end mark 'concluded' into the corresponding job through input into each prepress device 20. A list of the progress data as shown in FIG. 8 is displayed on the screen when the operator clicks the 'exhibition of progress data' in the opening menu of FIG. 2.

After all the required process control data Dpc is created, the operator inputs printing data including photograph data and document data required for production of a target print. When the printing data used for reproduction is new data, photograph data is read with the reading scanner 23 and the photograph data is transferred to the magnetic disk element 34 of the working memory unit 33. For example, photograph data representing Mt. Fuji and a car are scanned with the reading scanner 23, are respectively given the work file names A001 and A002, and are loaded into the magnetic disk element 34.

When the printing data Dps stored in the long-term storage unit 40 is used for reproduction, the operator retrieves the printing data Dps in the long-term storage unit 40 with the process control data editing device 36. The control unit 32 transfers the printing data Dps to the optical disk memory unit 41 via the data base control unit 43 of the long-term storage unit 40, and loads the data Dps to the working memory unit 33, where the work file name of the process control data Dpc is given to the printing data Dps. Printing data Dtem to be processed is now prepared.

Figure 9:
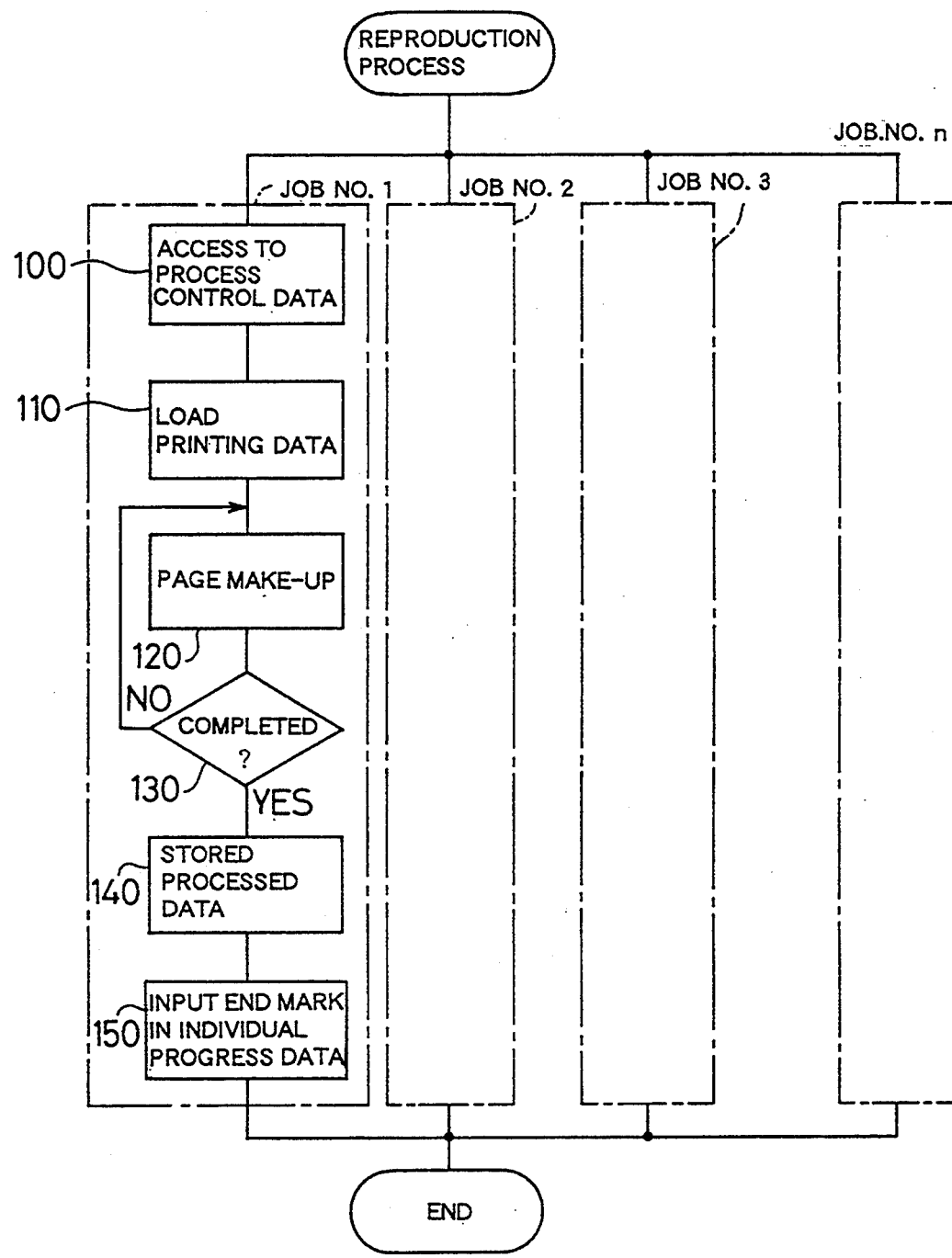
FIG. 9 is a flowchart showing reproduction process executed by the apparatus of the embodiment.

After creation of the printing data Dtem, each job in the prepress is executed. FIG. 9 is a flowchart showing steps of each job (Job No. 1, Job. No. 2, . . ., Job No. n). Here a page make-up process of Job No. 1 is explained by way of example.

At step 100, the operator specifies discrimination data Dds for the page make-up system 29, and reads the process control data Dpc stored in the process control data storage unit 37 via the communication network 10 to display the process control data Dpc on a display unit of the page make-up system 29. At the following step 110, the worker loads printing data, for example, parts data Dpt, which corresponds to the discrimination data Dds and is to be processed with the page make-up system 29, into a working memory unit of the page make-up system 29 according to the instructions of the process control data Dpc displayed on the display unit. The printing data is processed with the page make-up system 29 according to the instruction data Din in the process control data Dpc at step 120. When the operator completes the page make-up process step 130, the program proceeds to step 140 at which the operator gives a preset file name (A000) in the file management data Dfm to the processed data, and temporarily stores the processed data in the working memory unit 33. The worker then clicks 'concluded' on the local screen of the page make-up system 29 at step 150. Namely, an end mark 'concluded' is input into the Job No. 1 of the individual progress data Dip stored in the process control data storage unit 37.

As described above, prepress process is divided into plural jobs defined by the process control data Dpc. Once one job is completed, and the end mark 'concluded' is input into the individual progress data nip, the processed printing data can be further processed in the next job.

The operator can check the progress of each job and the whole process through operation of the process control data editing device 36. When the operator clicks the 'exhibition of progress data' in the opening menu of the process control data editing device 36 shown in FIG. 2 and selects a desired target print corresponding to the discrimination data Dds, a list of the individual progress data Dip and the total progress data Dtp are displayed as shown in FIG. 8. Whenever the end mark 'concluded' is input in each prepress device 20, the individual progress data Dip stored in the process control data storage unit 37 is renewed. The operator can thus readily check the progress of individual and total processing.

After confirming end marks in all the individual progress data Dip, the operator clicks 'concluded' for the whole process on the screen. Here the end mark 'concluded' is input into the total progress data Dtp.

Figure 10:
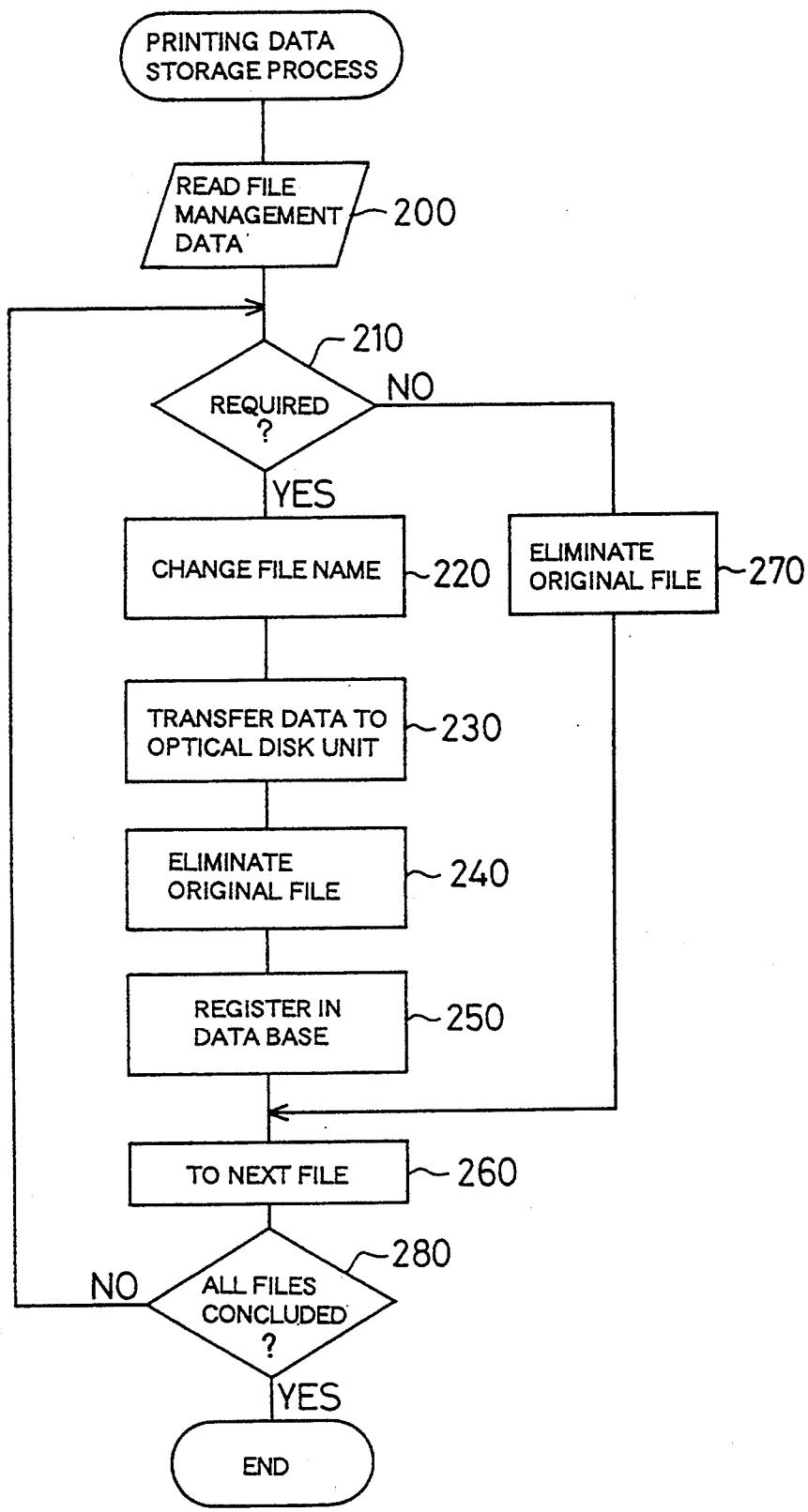
FIG. 10 is a flowchart showing storage process of printing data executed by the apparatus of the embodiment.

When the operator inputs the end mark into the total progress data Dtp, the process control data editing device 36 outputs a signal to the control unit 32, where storage of printing data is executed according to a program stored in the control unit 32. FIG. 10 is a flowchart showing the storage process.

At step 200, file management data Dfm is read according to the discrimination data Dds.

At the following step 210, it is successively determined whether files of printing data are to be permanently stored based on permanent storage data in the file management data Dfm. Here determination is executed in the order of job numbers. The permanent storage data represents information whether printing data is to be permanently stored and is set during edition of the process control data Dpc.

When permanent storage of a first file, for example, job No. 1, is 'required' at step 210, the program proceeds to step 220 at which the file name of the printing data is changed from the work file name to the storage file name. For example, the file name for printing data of Job No. 1 is changed from A001 to "Mt. Fuji".

At step 230, the printing data with the storage file name is transferred to the optical disk memory unit 41 of the long-term storage unit 40.

At the following step 240, the printing data stored in the working memory unit 33 is eliminated.

The program then proceeds to step 250 at which an address of the transferred printing data in the optical disk memory unit 41, the discrimination data Dds, and the file management data Dfm including the storage file name and the attribute of data are stored in the data base control unit 43.

When the permanent storage is 'not required' at step 210, on the other hand, the program proceeds to step 270 at which the printing data stored in the working memory unit 33 is immediately eliminated.

The program then goes to step 260 at which printing data of the next job number, for example, Job No. 2, is read and proceeds to step 280.

At step 280, it is determined whether all the printing data files have been processed. The program repeats steps 210 to 270 until all the files are processed according to the program. When processing of all the files is completed, the program exits from the routine.

The following effects are attained by the above structure embodying the invention.

(1) An operator previously specifies printing data which requires permanent storage during creation of process control data Dpc, and stores such printing data with discrimination data Dds and a storage file name in the long-term storage unit 40. The operator can therefore centrally manage and control permanently stored printing data and extract desired printing data from the storage unit 40 through a simple retrieval process with key words in the discrimination data Dds or the storage file name.

(2) A block of printing data required for a certain job is selectively extracted and loaded to the assigned prepress device 20 each time when the job is executed. Since the apparatus of the embodiment includes the working memory unit 33 and the process control data storage unit 37 which communicate with the prepress devices, each prepress device 20 requires only a relatively small capacity of storage unit and the whole system is thus favorably extensible.

(3) The apparatus creates individual progress data Dip corresponding to each job. An operator can check the progress of each job and the whole prepress process only by clicking 'exhibition of progress data' in the opening menu of the process control data editing device 36. Namely, the operator can readily manage and control the process.

The invention may be embodied in several other forms without departing from the scope of the invention, and the above embodiment is thus only illustrative and not restrictive in any sense.

What is claimed is:

1. A printing data management system for producing desired printing data representing an image to be printed, comprising:
plural prepress devices, each executing at least one prepress job;
a long-term storage unit for storing printing data including parts image data and assembled image data
a communication network for data transfer; and
a data management device, connected to said plural prepress devices and said long-term storage unit via said communication network, said data management device comprising:
(1) process control data editing means for editing process control data including:
(A) identification data for identifying said desired printing data to be produced; and
(B) data being generated for each of the plurality of prepress jobs including:
(B-1) instruction data indicating a certain process performed by each prepress device;
(B-2) file management data comprising
a first file name of printing data to be used in each prepress job,
permanent storage data specifying printing data to be permanently stored after each job, and
a second file name of the printing data to be permanently stored in the long-term storage unit; and
(B-3) individual progress data representing the progress of each prepress job;
(2) process control data storage means for storing said process control data edited by said process control data editing means;
(3) a working memory unit for temporarily storing printing data required for producing said desired printing data with said plural prepress devices;
(4) control means for, in response to the identification data supplied from one of said plural prepress devices,
supplying the process control data stored in said process control data storage means and the printing data stored in said working memory unit to the corresponding prepress device,
storing an end mark which is set in said individual progress data by each prepress device on completion of each job, and
outputting said individual progress data on demand; and
(5) storage data management means for
transferring the printing data specified to be permanently stored, as designated by the permanent storage data, and presently stored in said working memory unit, to said long-term storage unit, and
storing said printing data therein with the second file name.

2. A printing data management system in accordance with claim 1, wherein said process control data editing means further comprises an output unit for displaying a list of said instruction data and file management data on display means.

3. A printing data management system in accordance with claim 1, wherein said control means comprises output means for displaying a list of said individual progress data on display means.

4. A printing data management system in accordance with claim 1, wherein said control means comprises store protection means for keeping said file management data unchanged through processing with each of said plural prepress devices.

5. A printing data management system in accordance with claim 1, wherein said file management data includes attribute data defining whether printing data is parts data or final printing data.

6. A printing data management system in accordance with claim 1, wherein said first file name is identical with said second file name.

7. A printing data management system in accordance with claim 1, wherein said storage data management means successively transfers the printing data, to be permanently stored in the long-term storage unit, from said working memory unit to said long-term storage unit when end marks for all the prepress jobs are set in individual progress data.

8. A printing data management system in accordance with claim 1, wherein said storage data management means comprises elimination means for eliminating said printing data, to be permanently stored in the long-term storage unit, from working memory unit after transfer of said printing data from said working memory unit to said long-term storage unit is completed.

9. A printing data management method for producing desired printing data representing an image to be printed with a prepress system comprising:

plural prepress devices, each executing at least on prepress job;

a long-term storage unit for storing printing data including parts image data and assembled image data;

a communication network for data transfer; and a data management device, said method comprising the steps of:
  (1) preparing process control data including:
    (A) identification data for identifying said desired printing data to be produced; and
    (B) data, being generated for each of the plurality of prepress jobs, including:
      (B-1) instruction data indicating a certain process performed by each prepress device;
      (B-2) file management data comprising
        a first file name of printing data to be used in each prepress job,
        permanent storage data specifying printing data to be permanently stored after each job, and
        a second file name of the printing data to be permanently stored in the long-term storage unit; and
      (B-3) individual progress data representing the progress of each prepress job;
  (2) storing said process control data in said data management device;
  (3) temporarily storing, in said data management device, printing data required for producing said desired printing data with said plural prepress devices;
  (4) in response to the identification data supplied from one of said plural prepress devices to said data management device,
    supplying the process control data stored in said data management device and the printing data stored in said data management device to the corresponding prepress device,
    storing an end mark which is set in said individual progress data by each prepress device on completion of each job, and
    outputting said individual progress data from said data management device on demand; and
  (5) transferring the printing data specified to be permanently stored, as designated by the permanent storage data, and presently stored in said data management device, to said long-term storage unit and storing said printing data therein with the second file name.

10. A printing data management method in accordance with claim 9, wherein said step of preparing prepress control data further comprises the step of displaying a list of said instruction data and file management data.

11. A printing data management method in accordance with claim 9, wherein said step of preparing process control data comprises the step of displaying a list of said individual progress data.

12. A printing data management method in accordance with claim 9, wherein said step of supply the process control data comprises the step of keeping said file management data unchanged through processing with each of said plural prepress devices.

13. A printing data management method in accordance with claim 9, wherein said file management data includes attribute data defining whether printing data is parts data or final printing data.

14. A printing data management apparatus in accordance with claim 9, wherein said first file name is identical with said second file name.

15. A printing data management system in accordance with claim 9, wherein said step of transferring the printing data comprises the step of successively transferring the printing data, to be permanently stored in the long-term storage unit, from said data management device to said long-term storage unit when end marks for all the prepress jobs are set in said individual progress data.

16. A printing data management method in accordance with claim 9, wherein said step of transferring the printing data comprises the step of eliminating said printing data, to be permanently stored in the long-term storage unit, from said data management device after transfer of said printing data from said management device to said long-term storage unit is completed.

* * * * *